United States Patent [19]
Arnold

[11] Patent Number: 6,142,162
[45] Date of Patent: Nov. 7, 2000

[54] SYSTEM AND METHOD FOR ODORIZING NATURAL GAS

[75] Inventor: Joe F. Arnold, Birmingham, Ala.

[73] Assignee: Odoreyes Technology, Inc., Birmingham, Ala.

[21] Appl. No.: 09/336,097

[22] Filed: Jun. 18, 1999

[51] Int. Cl.$^7$ .................................................. G05D 11/13
[52] U.S. Cl. .................. 137/3; 137/101.19; 137/101.21; 137/624.11
[58] Field of Search ................................ 137/98, 99, 100, 137/101.19, 624.11, 2, 3, 101.21, 563; 48/195

[56] References Cited

U.S. PATENT DOCUMENTS

| | | |
|---|---|---|
| 4,007,755 | 2/1977 | Lerner et al. . |
| 4,025,315 | 5/1977 | Mazelli . |
| 4,073,304 | 2/1978 | Lerner et al. ...................... 137/101.21 |
| 4,180,083 | 12/1979 | Miyaoka et al. . |
| 4,436,674 | 3/1984 | McMenamin . |
| 4,611,294 | 9/1986 | Stanfill . |
| 5,032,063 | 7/1991 | Zeck et al. . |
| 5,293,892 | 3/1994 | Fourqurean . |
| 5,406,970 | 4/1995 | Marshall et al. . |
| 5,476,115 | 12/1995 | Lalumandier et al. ............ 137/101.19 |
| 5,490,766 | 2/1996 | Zeck ............................... 137/101.21 X |
| 5,632,295 | 5/1997 | Smars . |

Primary Examiner—Kevin Lee
Attorney, Agent, or Firm—Kenneth C. Hill

[57] ABSTRACT

A method for odorizing natural gas in the pipeline utilizes bypass piping in conjunction with a liquid odorant storage tank. The bypass line causes a precisely known volume of bypass gas, saturated with odorant, to enter the gas line at regular intervals determined by gas flow through the line. Natural gas, having a known pressure higher than the pipeline pressure, is provided to the bypass line, and controlled by a control valve. The flow characteristics of the control valve are known in advance, so that opening the valve for a known time period allows a known quantity of bypass gas to flow through the valve. A controller monitors the gas line, and each time a pre-determined quantity of gas flows through the line, the control valve is opened for the calculated time. The bypass line is connected from the control valve to the odorant tank, and from the odorant tank to the gas line. When the control valve is opened, a known amount of saturated bypass gas flows from the odorant tank into the main line, which causes odorization of gas in the line. Preferably, the controller can compensate for temperature changes within the odorant tank. Further, the controller can preferably be controlled and monitored remotely.

43 Claims, 2 Drawing Sheets

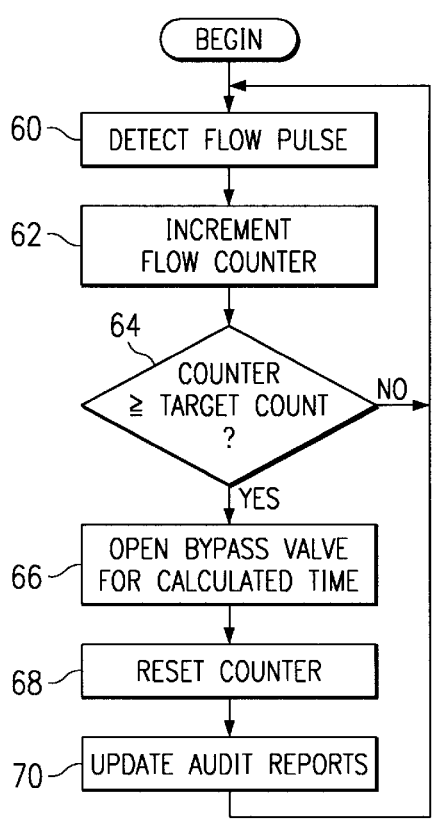
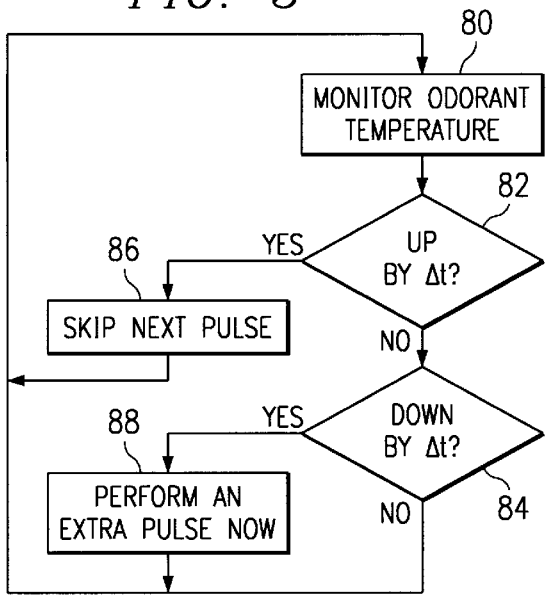
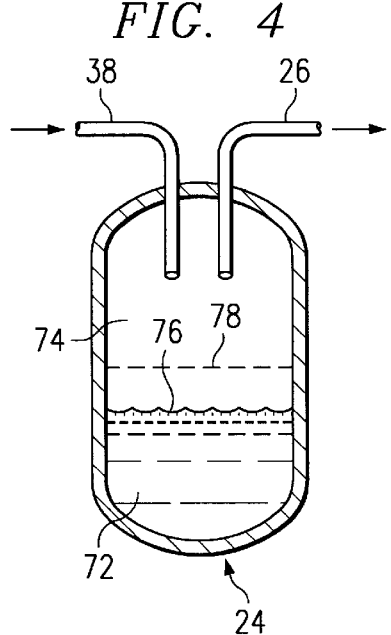
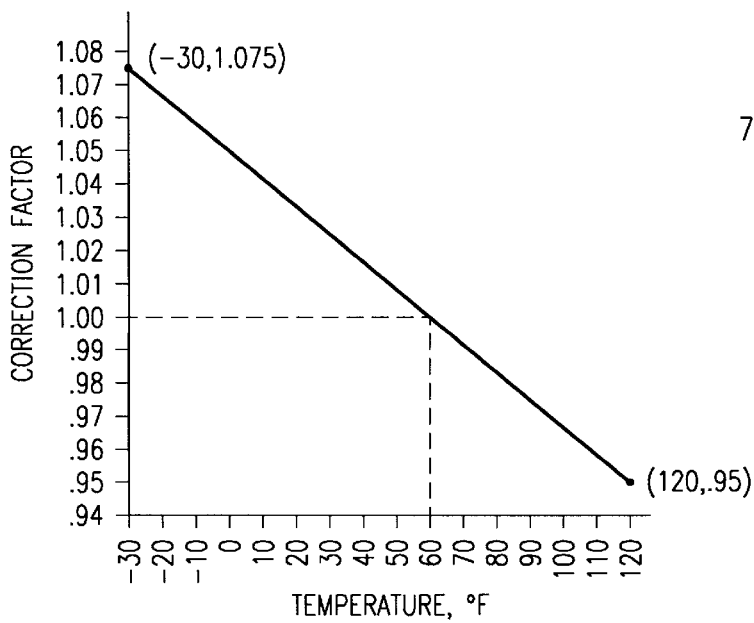

SYSTEM AND METHOD FOR ODORIZING NATURAL GAS

BACKGROUND OF THE INVENTION

1. Field of the Invention

The present invention relates generally to odorization of natural gas, and more specifically to an improved system and method for adding odorant to natural gas flowing in a pipeline.

2. Description of the Prior Art

Natural gas is odorless. Because of its potentially dangerous nature, for many years federal regulations have required the addition of an odorant to natural gas so that it can be detected by smell. Odorants such as tertiary butyl mercaptan (TBM) and various blends of commonly accepted chemicals are in common use in the industry.

The odorants added to natural gas, which are provided in liquid form, are often added to the gas at the location where distribution gas is taken from a main gas pipeline and provided to a distribution pipeline. At this point, the gas pressure is stepped down through a regulator, typically from a pressure of approximately 600 psi or more to a lower pressure of approximately 100 psi or less. The odorants can also be added to gas in the main transmission pipeline.

Odorants used with natural gas are extremely concentrated, so that only a small amount of liquid is needed to odorize a relatively large volume of natural gas. For example, with odorants such as TBM and other blends, it is common to use approximately 0.75 lbs. of liquid odorant to adequately odorize 1,000,000 SCF of natural gas.

Odorants such as TBM and other blends are mildly corrosive, and very noxious. It is important that a correctly measured amount of odorant be added to natural gas; otherwise, various problems will result. For example, over-odorization results in excess odors within the valves, pipes, and other equipment used in natural gas distribution. In addition, too much odorant causes the distinctive odorant smell to be noticeable even after the natural gas is burned. This leads to consumer calls complaining of natural gas leaks, each of which must be responded to by the natural gas distribution company. The expense of such calls, when there is no leak involved, is quite high.

It is also important that the odorant levels not be too low. Safety considerations mandate that a natural gas leak be easily detectable by most people. The proper concentration of odorant within natural gas provides this safety measure, but under-odorization is dangerous because actual leaks may not be detected in time.

Two primary techniques are in current use to provide odorization to natural gas in a main distribution pipeline. One technique involves injecting liquid odorant directly into the pipeline. A high pressure injection pump pumps odorant from a liquid storage tank into a small pipe which empties directly into the main gas pipeline. Because the odorant is so volatile, drops injected into the pipeline immediately disperse and spread throughout the gas in the pipeline. Within a few seconds, a few drops of liquid odorant are evenly distributed in gaseous form.

Flow of gas in the pipeline is metered, so that liquid odorant can be injected periodically. Typically, for example, a few drops of odorant is all that is required for a 1,000 SCF of natural gas. When the gas flowmeter indicates that 1,000 SCF of natural gas have flowed through the pipe, the corresponding, pre-calculated amount of liquid odorant is injected into the pipeline. Every time another 1,000 SCF of gas flows past the injection point, another injection is made. Even though the injection is periodic, odorant diffusion within the gas provides for adequately, and relatively even, odorant levels throughout the pipeline.

The injection technique has several important drawbacks. First, as described above, the liquid is extremely noxious. The pump must be designed so that no odorant can leak out. This requires a pump design which is relatively expensive and complex in order to stand up to operating conditions. Failure of this relatively complex injection pump results in the failure of the odorization system.

The second technique for odorizing natural gas involves bypassing a small amount of natural gas, at a slightly higher pressure than the low pressure distribution pipeline, through a tank containing liquid odorant. This bypass gas absorbs relatively high concentrations of the odorant while in the tank. When this heavily odorized bypass gas is placed back into the main pipeline, the odorant, now in gas form, diffuses throughout the pipeline in much the same manner as was the case with the liquid injection system.

Because the bypass gas picks up such large amounts of odorant from the liquid in the tank, becoming completely saturated with odorant gas, it is necessary that carefully monitored small amounts of bypass gas be used. The present approach is to allow a small amount of bypass gas to flow into a holding bottle having a known volume. The bypass line is then closed, and the gas in the bottle is allowed to flow into the odorant tank. This displaces an equivalent amount of saturated bypass gas already in the tank, which then travels into the distribution pipeline.

This bypass technique avoids the failures which can occur with the odorant pumps of the injection technique, but has drawbacks of its own. The valving used to pipe natural gas into the measuring bottle can fail, although this is less likely than failure of an injection pump. However, the bottle is of a fixed size, and cannot easily accommodate large changes in the rate of gas flow through the distribution pipeline. For example, if the bypass bottle was correctly sized for a gas flow of 100,000 SCF per hour, increasing flow in the pipeline to 500,000 SCF per hour can cause difficulties with this technique. Because the size of the bottle cannot change, it must be replaced, or operated five times as often for the higher gas flow. Depending upon the design of the system, this may not be physically possible. For example, if the bottle is operated once every four seconds at the low flow rate, and has a one second cycle time, it is not possible to operate the same equipment at a rate more often than once per second. This situation would necessitate changes to the equipment in the field.

It would be desirable to provide an odorization technique, and equipment to be used therewith, which provides both a more reliable and flexible technique for odorizing natural gas. It would be desirable that the equipment be simple and reliable in operation, and that it be flexible enough to easily accommodate significant changes in the operating condition of the gas pipeline.

SUMMARY OF THE INVENTION

Therefore, in accordance with the present invention, a method for odorizing natural gas in the pipeline utilizes bypass piping in conjunction with a liquid odorant storage tank. The bypass line causes a precisely known volume of bypass gas, saturated with odorant, to enter the gas line at regular intervals determined by gas flow through the line. Natural gas, having a known pressure higher than the pipeline pressure, is provided to the bypass line, and controlled by a control valve. The flow characteristics of the control valve are known in advance, so that opening the valve for a known time period allows a known quantity of bypass gas to flow through the valve. A controller monitors the gas line, and each time a pre-determined quantity of gas flows through the line, the control valve is opened for the calculated time. The bypass line is connected from the control valve to the odorant tank, and from the odorant tank to the gas line. When the control valve is opened, a known amount of saturated bypass gas flows from the odorant tank into the main line, which causes odorization of gas in the line. Preferably, the controller can compensate for temperature changes within the odorant tank. Further, the controller can preferably log pertinent data about the system, and be controlled and monitored remotely.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a flowchart illustrating normal operation of the preferred controller;

FIG. 4 is a diagram of the odorant tank illustrating the need for temperature compensation;

FIG. 5 is a flowchart showing operation of the controller in performing temperature compensation; and FIG. 6 is a graph illustrating odorant changes in volume as a function of temperature changes.

DESCRIPTION OF THE PREFERRED EMBODIMENT

As described below, the preferred embodiment of the present invention provides a bypass odorization system in which small amounts of odorant saturated gas are added to a natural gas distribution or transmission pipeline. A known, pre-calculated volume of saturated gas is added for known volume of gas flowing through the main pipeline. The known volume of gas is obtained by opening a control valve in the bypass line for a pre-determined time period, referred to herein as the "dwell time" of a control valve. Because the valve characteristics and pressure drop across the valve are known, the volume of gas which flows through the valve during the dwell time can be accurately pre-calculated. Each cycle of opening and closing the control valve is referred to as a pulse.

Figure 1:
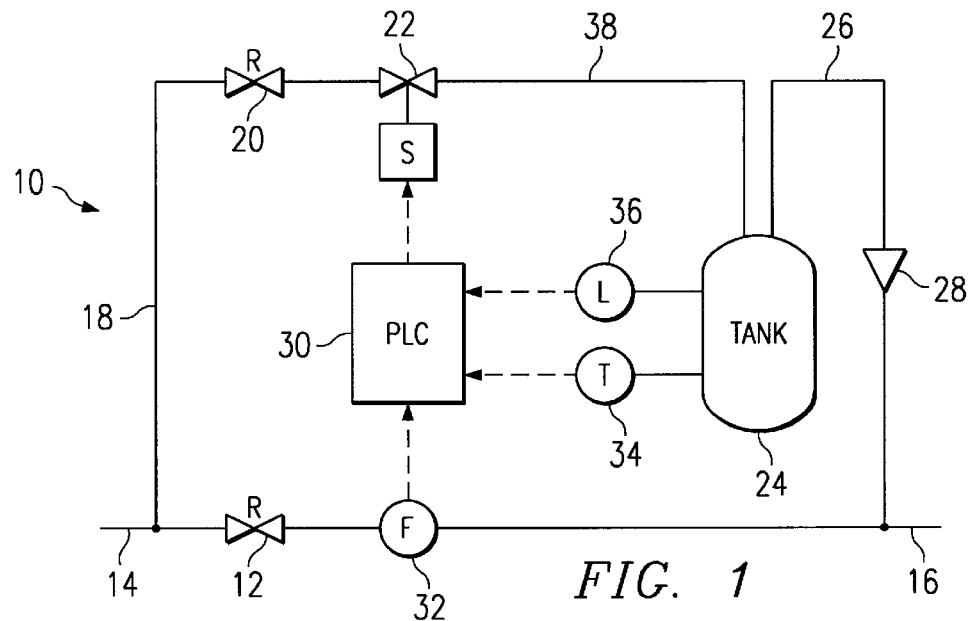
FIG. 1 is a diagram of a preferred natural gas odorizer constructed in accordance with the present invention.

Referring to FIG. 1, a gas odorization system 10 is shown schematically. A pressure regulator 12 is used to connect a high pressure pipeline 14 with a distribution pipeline 16. Pressure in the main pipeline 14 can be, for example, 600–800 psi, while gas pressure in the distribution pipeline 16 is much lower. A typical pressure in distribution pipeline 16 is 100 psi.

A tap 18 off the high pressure pipeline 14 is connected to a bypass regulator 20, which in turn allows bypass gas to flow to control valve 22. Regulator 20 is preferably a differential regulator which always provides gas at a pressure differential of 12–40 lbs. above that in distribution pipeline 16, regardless of any variations that may occur in the gas pressure in the main pipeline 14. A pressure differential of 12–40 p.s.i. may be chosen, but it is desirable that the gas supplied to control valve 22 be fixed at a known value above the gas pressure in line 16. A differential regulator may be used to maintain a constant pressure above that in the pipeline 16.

Other techniques can be used to proved the pressure differential for the bypass gas line. For example, a compressor can be used to raise the pressure in the bypass line above that in the distribution line 16. It is still desirable to provide a differential regulator so that the bypass line pressure remains a constant value above that in the distribution line 16. This maintains the accuracy of gas flow through the control valve 22 as is explained in more detail below. Any technique which maintains pressure into the bypass line at a constant, known differential above the pressure in distribution line 16 can be used in this system.

Odorant is stored in tank 24 in liquid form. Any odorant used for odorizing natural gas, such as TBM, may be used. Outlet line 26 passes from tank 24 through a check valve 28 and back into distribution pipeline 16.

When odorant tank 24 is filled with liquid odorant, space is left for gas above the surface of the odorant. In operation, this space is filled with natural gas which has entered the tank 24 through control valve 22. Because of the high volatility of the liquid odorant, the gas contained in tank 24 above the surface of the liquid odorant is saturated with odorant in gaseous form.

A programmable logic controller 30 (PLC) is used to control operation of the odorizer 10. PLC 30 has inputs connected to a flow meter 32 in distribution pipeline 16, a temperature sensor 34 within the odorant tank 24, and a level sensor 36 within odorant tank 24. As described below, the temperature is required to compensate for temperature fluctuations within the odorant, but the level sensing is optional. Flowmeter 32 generates a signal proportional to the flow of gas within pipeline 16. Preferably, flowmeter 32 provides a digital pulse, or an analog signal, each time a known quantity of gas flows through pipeline 16. By counting the pulses provided by flowmeter 32, or by calculating flow from the analog signal provided by an analog meter, PLC 30 can determine when a known, pre-selected volume of gas has flowed through pipeline 16.

Temperature sensor 34 measures the temperature of liquid odorant within tank 24. In a typical installation, tank 24 is located above ground, and temperature variations in accordance with weather and time of day are common. The liquid odorant contained in the tank 24 expands as its temperature increases, and contracts as its temperature decreases. This volumetric change requires compensation to provide proper odorization of the gas in line 16 as will be described below in more detail.

Level sensor 36 detects the level of liquid odorant remaining in tank 24. This data is useful to an operator of the odorizer, particularly when the odorizer is monitored remotely as described below, in order that liquid odorant can be replenished when its level becomes low, and so that proper odorant use may be verified.

PLC 30 also provides an output signal which controls valve 22. Control valve 22 is preferably an electrically actuated solenoid valve, but can be any valve which may be controlled by a suitable signal from the PLC 30.

Because bypass regulator 20 regulates gas in the bypass line to be a known differential higher than the pressure in distribution line 16, preferably 12–40 p.s.i., the flow rate of gas through control valve 22 can be easily calculated from the properties of the valve. Valve manufacturers typically provide tables, equations, or other data from which the flow rate of gas through control valve 22 can be determined. Once this flow rate is determined, in advance, for valve 22, the valve need merely be held open for a calculated interval, referred to herein as the "dwell time", in order to allow a known volume of gas to pass through bypass line 38 and into odorant tank 24. The gas flowing into tank 24 will cause an equal volume of saturated gas to flow through line 26, and check valve 28, into distribution line 16. By simply adjusting the dwell time for valve 22, the volume of bypass gas injected into the main line 16 can be easily controlled.

Figure 2:
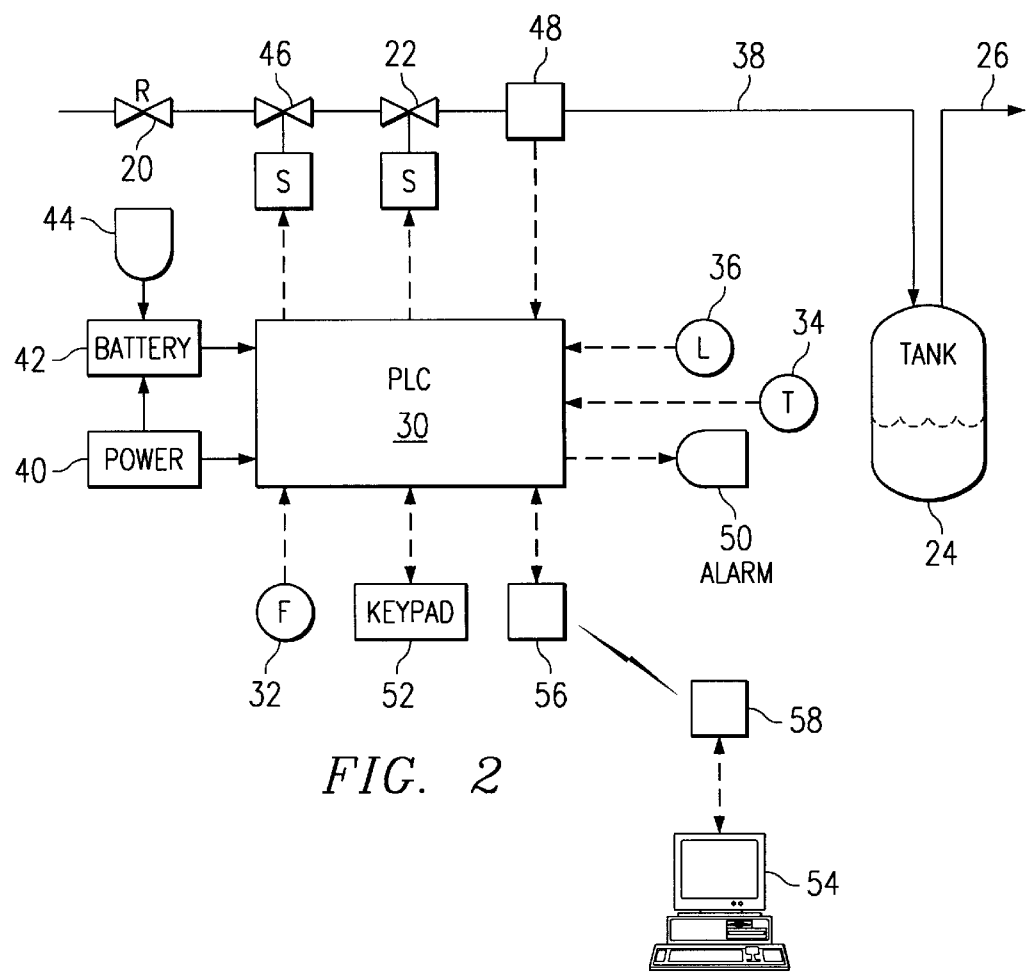
FIG. 2 is schematic diagram of the electronics and controller of the preferred odorizer of FIG. 1.

FIG. 2 is a more detailed diagram illustrating the electrical connections for PLC 30. PLC 30 itself may be any suitable programmable logic controller widely available in the industry, and may be, for example, a DL250CPU controller available from PLC Direct.

As described in connection with FIG. 1, PLC 30 has inputs connected to flowmeter 32, temperature sensor 34, and optional level sensor 36. PLC 30 provides a control signal output to valve 22, which is preferably an electrically actuated solenoid valve. In addition to these primary connections, other inputs and outputs are provided for PLC 30 as shown in FIG. 2.

A power supply 40 provides power for the PLC 30. Power supply 40 may be any suitable supply as known in the art. Backup battery 42 is preferably provided to keep PLC 30 powered up in case of a failure in supply 40. In addition, a solar supply 44 may be used to provide charge to backup battery 42. In suitable conditions, power supply 40 can be dispensed with and all power for the PLC 30 provided from the solar supply 44 through battery 42. This is especially suitable for installation in remote locations where normal power may not be available.

For safety considerations, a master shutdown valve 46 is preferably provided in the bypass line along with control valve 22. Shutdown valve 46 operates in conjunction with flow sensor 48, and is used only in the case of a failure elsewhere. Shutdown valve 46 is maintained in a normally opened position during odorizer operation. When control valve 22 is opened, flow sensor 48 should sense a flow of gas through line 38. It is not necessary to measure the volume of gas flowing through line 38, but simply to sense its presence. If PLC 30 determines that no gas is sensed by sensor 48 while the control valve 22 is opened, master shutdown 46 is closed to stop all bypass gas flow. Such a situation could occur with a failure of valve 22, and closing the shutdown valve 46 prevents the escape of natural gas out of the system. If control valve 22 fails in an open position, flow sensor 48 will be continuously activated. Because this condition would cause extreme over-odorization of the gas in pipeline 16, shutdown valve 46 can be used to interrupt gas flow through the bypass system. In this case, if desirable, the PLC 30 can be programmed to toggle the shutdown valve 46 in response to gas flowing through the pipeline, in effect using shutdown valve 46 as a backup control valve.

PLC 30 also provides one or more alarm outputs 50. These outputs can be used to activate different types of alarms as appropriate and as known in the art. For example, a visible and/or audible alarm can be provided at the odorizer location. In addition, a signal may be sent to a remote site, via direct connection, radio or telephone line, to indicate to an operator that a failure has occurred and that immediate action is required. Different types of alarms, both informative and emergency, may be provided as desired by PLC 30. The provision of alarms of different types is well known in the art, and will not be discussed in detail herein.

In the preferred embodiment, the PLC 30 monitors the signal from the flow meter 32 to ensure that a signal is being received. If the PLC 30 loses the signal from the flow meter 32, whether such signal is digital pulses or an analog signal, PLC 30 assumes that the flowmeter 32 is not operating. At this point, any of three preferred options can be performed, with the desired option being programmed into the PLC ahead of time by an operator. The first option is to simply shut down the odorizer, by closing both the control valve 22 and the shutoff valve 46, and generate the appropriate alarm.

The second option is to enter a backup mode in which the control valve 22 is operated at a constant rate which is programmed in advance, while activating the appropriate alarms. The third option is similar to the second, except that the average gas flow rate over a previous interval of time, for example one or two hours, is assumed to remain constant. The control valve 22 is then operated at a constant rate appropriate for that flow. As before, an appropriate alarm is generated.

PLC 30 is also provided with at least one, preferably two, input/output data connections. A keypad 50, and an integral associated display, is physically located within the odorizer 10 for local access to the system by an operator. PLC 30 can be reprogrammed through keypad 52, and its status reviewed on the associated display.

Preferably, a computer 54 can be connected to PLC 30 through a second input/output connection. This connection can be a direct serial link as known in the art, or may be made over a telecommunications line through modems 56 (associated with PLC 30) and 58 (associated with remote computer 54). Through the use of modems 56, 58 connected over a phone line, computer 54 can be located anywhere. Use of computer 54 provides for greater ease in programming the PLC 30 and in collecting data generated by and stored within PLC 30. Preferred methods for utilizing a remote computer 54 in conjunction PLC 30 will be described in more detail below. When a direct serial link is available, computer 54 can be, for example, a laptop computer carried to the odorization site.

Most of the time, odorizer 10 will be functioning in its normal operating mode. FIG. 3 is a flowchart describing the normal operating mode for PLC 30.

As gas flows through the distribution gas pipeline, a signal proportional to gas flow is generated by the flowmeter 32. This signal is preferably digital pulses, or an analog signal which is converted to pulses for easy counting by the PLC. These pulses are detected within the PLC 60, and for each pulse detected, a flow counter is incremented 62. The value stored within the counter is compared with a target count 64, and the PLC returns to step 60 to await another flow pulse if the counter value is less than the target count.

The target count is a value selected in advance as a function of both the properties of flowmeter 32, and the desired volume of gas flow through line 16 which is desired to trigger a cycle of odorizer 10. For example, if the flowmeter generates a pulse for every 10 SCF of gas flow, and a cycle of odorizer is desired for every 200 SCF, the target count can be set to 20.

Once the counter reaches the target count in step 64, control passes to step 66. The bypass control valve is opened for the precalculated dwell time (step 66), and the flow pulse counter is reset at 68.

It is desirable for the odorizer 10 to maintain information indicating its operational history. This information is important for various reasons to both oversee operation of the equipment and for historical purposes in case of an accident. Audit information which is saved typically includes data showing the volume of odorant placed into the pipeline, and similar information such as gas flow through the line and the level of odorant remaining in the tank. This information is typically updated in step 70, and stored within the memory of the PLC 30. After the audit report information is updated 70, control returns back to step 60 to await the next pulse from the flowmeter.

As will now be described, the present bypass technique requires compensation for changes in temperature of the liquid odorant. FIG. 4 illustrates the necessity for such temperature compensation.

As shown in FIG. 4, bypass gas flows into odorant tank 24 through line 38, and flows out of odorant tank 24 to the gas distribution line through line 26. Tank 24 contains a quantity of liquid odorant 72, leaving a space 74 above an upper surface 76 of the odorant 72. When the temperature of the odorant 72 is constant, the upper surface level 76 does not change. Thus, when a given volume of gas flows into the tank 24 through line 38, a equal volume flows out of tank 24 through line 26.

The liquids used as odorants for natural gas are relatively sensitive to temperature changes. When the temperature of the liquid increases, so does its volume. When the temperature decreases, its volume decreases likewise. This change in volume with temperature requires compensation by the controller.

Referring to FIG. 4, assume that upper surface 76 represents the upper surface of odorant 72 at a given temperature. If the temperature of the liquid odorant increases, such as can happen when direct sunlight shines on the odorant tank, its volume expands. After the expansion, the upper surface of the odorant is in location 78. Because the odorant 72 has expanded to fill the volume between surfaces 76 and 78, gas equivalent to this volume is forced out of tank 24. Because of the set up of the system, as illustrated in FIG. 1, this excess gas, which is saturated with odorant in the gas phase, will flow through line 26 and into the distribution line.

Thus, as a result of liquid odorant expansion, additional odorized bypass gas has been placed into gas line. Unless compensated for, this will cause over-odorization of the gas in the distribution line. In the preferred embodiment, the odorizer compensates for such a temperature increase by simply skipping one or more odorizing pulse cycles normally caused by gas flow through the distribution line.

In a similar manner, if the initial level of the odorant is as indicated by upper surface 78, and the odorant cools, its volume will diminish. Cooling can be caused by, for example, night or cloudy weather causing an ambient temperature change. As the upper surface of the odorant falls from level 78 to level 76, the volume change must be made up by additional gas in the space 74.

Because of check valve 28 on line 26, gas cannot flow back into tank 24 through line 26. In addition, because of the valves on line 38, additional gas cannot flow into tank 24 through line 38. Thus, the pressure in tank 24 will decrease slightly when the volume of the liquid decreases. This slight decrease in pressure will eventually be made up by gas flowing into tank 24 through line 38 when the control valve 22 is opened, but may take one more pulses of the control valve 22 to raise the gas pressure within tank 24 and again enable gas to flow out through line 26.

In the preferred embodiment, this loss of volume due to a lowering of the upper surface 76 of liquid odorant is compensated for by executing one or more additional pulses of the control valve 22. This will supply extra gas into the interior 74 to make up for the loss in volume caused by the cooling of the odorant 72.

Regardless of the temperature of the odorant, so long as the temperature remains constant, the volume will remain constant, except for the very small decreases caused when new gas enters the tank 24 and absorbs odorant. Thus, compensation by way of extra pulses, or eliminating pulses, need only be performed when the temperature changes.

FIG. 5 is a flowchart illustrating operation of the PLC 30 to compensate for temperature changes in the liquid odorant. As shown in step 80, the odorant temperature is constantly monitored. A check is made to see if the temperature of the odorant has increased by a sufficient temperature 82. If not, a check is made to see if odorant temperature has decreased by a sufficient change in temperature 84. If not, the PLC returns to its monitor cycle 80.

If the temperature has gone up by a sufficient amount (step 82), additional odorant has been injected into the distribution line by the volume increase of the odorant. Therefore, the PLC skips the next odorant pulse 86 by simply resetting the flow pulse counter, when it reaches the target count, without opening the bypass control valve for the pre-calculated dwell time.

If the result of step 84 indicates that the odorant has cooled by a sufficient amount, additional gas needs to be supplied to the interior of odorant tank 24. The PLC therefore performs an extra pulse immediately 88 by opening the bypass valve for the calculated dwell time without resetting the flow pulse counter. This will cause an extra volume of gas to be injected into the odorant tank to make up for the change in volume of the cooling liquid odorant.

As an example of the temperature compensation, assume that a pulse is to be generated for every 100 standard cubic feet of gas which flows through the line. Further assume that 100 cubic inches of saturated gas provides the required level of odorant for 100 standard cubic feet of gas. Whenever the temperature rises enough that the volume of the liquid odorant increases by 100 cubic inches, one pulse will be skipped. Whenever the temperature falls by the same amount, an extra pulse will be added.

As the temperature of the odorant rises and falls, pulses will be occasionally skipped and added respectively. The actual volumetric change which occurs as a result of temperature variations is a function of both the change in temperature and amount of odorant in the tank. Changes in volume are a percentage of total liquid volume, so different odorant levels will see different absolute volume changes for a given temperature change.

Any suitable technique can be used to control for these temperature changes. A simplifying assumption can be made regarding volume, so that pulses are generated or skipped regardless of the actual volume of liquid odorant currently in the tank. If desired, the output from the level sensor can be incorporated into the calculation, so that actual volumetric changes are used to determine when to add or subtract pulses. It is also possible to vary the dwell time of control valve 22, or adjust the timing between pulses, to compensate for temperature changes. Whether changing the number of pulses, the dwell time of the control valve, or the timing between pulses, compensating for temperature changes in the liquid odorant is desired to provide proper odorization levels.

FIG. 6 is a graph illustrating how the liquid odorant volume varies with temperature. This particular graph is for BP CAPTAN between the temperatures of −30° F. and 120° F. It indicates a correction factor which must be applied to obtain the real volume of the liquid in compensation for temperature variations. It is normalized for a temperature of 60° F. This data is widely available, and differs for different materials. The graph shown is for illustrative purposes to show how temperature compensation is performed in the preferred embodiment.

Because this odorant expands as its temperature rises, the measured volume of liquid is multiplied by a smaller number to give true volume. For example, at 120° F., the measured volume must be multiplied by 0.95 to arrive at the actual volume which would be measured at 60° F.

As shown by the straight line on this graph, volumetric changes are essentially linear. Over 150° F., volume of a given amount of liquid odorant will change by more than 10%. Using the values from this graph, it will be appreciated that the liquid will change in volume by approximately 0.00083% for each degree change in temperature. For a liquid volume of 20 cubic feet, this amounts to approximately 29 cubic inches per ° F. If 100 cubic inches of bypass gas pass through the control valve during each odorizer pulse, an extra pulse will be needed for approximately every three degrees change in odorant temperature to compensate for the change in volume of the liquid odorant.

As described above, operation of the PLC is simplified by making several calculations ahead of time, and storing into the PLC the resulting data needed to properly operate the odorizer. For example, calculation of bypass gas flow rates through the control valve need only be performed once, unless the valve is changed. Further, the required amount of bypass gas which must be released for each pulse will not change, unless the odorant is changed, or the desired ratio of odorant to gas is changed. Because these change so rarely as to be considered fixed, this calculation can be performed in advance and the result programmed into the PLC.

In order to perform the calculations necessary to determine the dwell time of the control valve, several items of information are needed. These include the flow characteristics of the control valve, generally provided from the manufacturer for given pressure drops, and how often pulses are needed, in terms of cubic feet per pulse of gas flowing through the main gas line. Also needed is the rate of odorization, in pounds per million cubic feet or other mass per volume ratio. Finally, the solubility of the odorant in natural gas must be known, along with the operating pressures for the system, including pressure corrections such as operating atmospheric pressure.

Using the solubility factors, pressures and required pulse rate, known calculations provide the volume of saturated gas which will be needed for each pulse of the odorizer. For example, assuming gas line pressure of 230 psig, BP odorant having a solubility factor of 0.7, and an odorizer pulse every 500 cubic feet of gas flow, approximately 300 cubic inches of saturated gas must be added in each pulse to give an odorization rate of 0.75 pounds per million standard cubic feet. In other words, if the odorizer is pulsed once every 500 cubic feet, each pulse must provide 0.000375 pounds of odorant in the pulse of saturated gas, which is approximately 300 cubic inches under the conditions of the example.

Once the pulse volume is known, the required dwell time per pulse is easily determined from the flow rate of the control valve. For this example, if the valve allows 400 cubic inches per second to flow under operating conditions, the dwell time of the control valve is 0.75 seconds. Under operating conditions, a 0.75 second pulse allows enough saturated gas to flow into the line to properly odorize 500 cubic feet of gas. Other conditions and requirements and conditions will, of course, give different results.

Once these calculations are made, the volume for which a pulse will be made, and the dwell time for each pulse, are loaded in to the PLC. If conditions change, the PLC can be easily reprogrammed by simply running the calculation again and loading the new control data into the PLC. This can be performed remotely, by a portable computer connected directly to the PLC on site, or by entering the new data directly at the PLC keypad.

It will be appreciated by those skilled in the art that the described system provides for improved operation. The system is very reliable, because there are no injection pumps to fail. Only a single valve is regularly operated to odorize the gas. The system is flexible, because changes in operating conditions can be accommodated by changing either the frequency of pulsing the bypass system, or changing the dwell time of the control valve. Because of its extreme operational simplicity, the PLC 30 can be programmed in a more complex manner to take into account variables such as temperature changes in the liquid odorant.

The described system allows for remote control and monitoring of the odorizer. As previously described, in addition to on site control through the keypad or by a direct link with a laptop computer, the PLC 30 may be reprogrammed by the remote computer 54 through the communications link. In addition, operational data stored within the PLC 30 may be read remotely by the computer 54. This allows for central monitoring and control of a large number of odorizers located in widely separated locations. Normal operating data as well as alarm data can be gathered remotely, so that actual presence at the odorizer site can be minimized.

Further, if desired the PLC 30 need not even be located at the site where odorant is injected into the gas line. Instead, the various valves and sensors can be connected to actuators which are remotely controlled, either over a physical connection such as a direct communications line, or by remote radio control. Such an arrangement could be useful for example, when it is desired to control a large number of odorizers from a central location. Instead of using separate PLC's at each location, a larger, central computer can be programmed to monitor all of the odorizers simultaneously and control each of them in the same manner as described above. While adding communications burdens to the system, this allows for simpler central control and programming.

While the invention has been particularly shown and described with reference to a preferred embodiment, it will be understood by those skilled in the art that various changes in form and detail may be made therein without departing from the spirit and scope of the invention.

What is claimed is:

1. A system for odorizing natural gas flowing through a main line, comprising:
   a bypass line adjacent to a main gas line;
   an odorant tank connected to the bypass line, wherein bypass gas flows through the bypass line, through the odorant tank, and into the main line;
   a control valve in the bypass line, wherein bypass gas flows through the odorant tank and into the main gas line only when the control valve is open;
   a meter on the main gas line which monitors gas flow through the main gas line;
   a controller connected to the meter and the control valve, wherein the controller opens the control valve for a predetermined dwell time, proportional to an amount of bypass gas needed to odorize gas in the main gas line, each time a preselected quantity of gas flows through the main gas line.

2. The system of claim 1, further comprising:
a temperature sensor in the odorant tank, wherein the temperature sensor senses the temperature is connected to the controller and provides a signal thereto proportional to the temperature of liquid odorant in the tank;
wherein the controller compensates for changes in odorant temperature by modifying its opening of the control valve.

3. The system of claim 2, wherein the volume of the liquid odorant in the odorant tank increases when its temperature increases, and decreases when its temperature decreases, and wherein the controller adds extra openings of the control valve to compensate for decreased odorant temperature, and skips openings of the control valve to compensate for increased odorant temperature.

4. The system of claim 2, further comprising:
a flow sensor in the bypass line to detect flow of gas through the bypass line; and
a cutoff valve in the bypass line and connected to the controller, wherein the controller closes the cutoff valve if the flow sensor fails to detect gas flow through the bypass line when the control valve is opened.

5. The system of claim 1, further comprising:
a pressure regulator in the bypass line, upstream of the control valve and the odorant tank, for providing gas from the main gas line at a selected pressure above the main gas line pressure at a location downstream of the odorant tank.

6. The system of claim 5, wherein the control valve is located in the bypass line between the pressure regulator and the odorant, whereby the control valve is upstream of the odorant tank.

7. The system of claim 1, wherein the controller includes an input/output connection, wherein data accepted over the input/output connection can reprogram settings in the controller, and wherein data generated by the controller can be output over the input/output connection.

8. The system of claim 7, wherein the input/output connection is a serial data connection.

9. The system of claim 7, wherein the input/output connection is connected to a modem.

10. The system of claim 7, wherein the input/output connection is connected to a touchpad and an associated display.

11. The system of claim 7, wherein the data generated by the controller includes operating reports.

12. The system of claim 7, wherein the data generated by the controller includes diagnostic information.

13. The system of claim 1, further comprising:
a level sensor in the odorant tank and connected to the controller, wherein the level sensor provides to the controller a signal proportional to the liquid odorant level in the odorant tank.

14. The system of claim 1, further comprising:
a power supply connected to the controller and providing power thereto.

15. The system of claim 14, further comprising:
a backup battery connected to the power supply for supplying power to the controller in case of power supply failure.

16. The system of claim 15, further comprising:
a solar device connected to the battery for providing power thereto.

17. A controller for a natural gas odorant system, comprising:
an input adapted to accept an input signal from a gas flow meter;
an output adapted to control a valve;
a memory storing a dwell time value, and a second value indicative of how often the valve should be opened with relation to gas flow;
an output driver for sending a signal from the output for a time period equal to the stored dwell time, wherein the signal is sent from the output at times determined by the second value and data received through the input.

18. The controller of claim 17, further comprising:
a second input adapted to accept an input from a temperature sensor indicating temperature of liquid odorant;
wherein the controller modifies operation of the output driver in response to changes in the second input.

19. The controller of claim 18, wherein the controller modifies operation of the output driver to add extra sendings of the output signal to compensate for decreased liquid odorant temperature, and to inhibit sendings of the output signal to compensate for increased odorant temperature.

20. The system of claim 17, wherein the controller further comprises:
an input/output connection, wherein data accepted over the input/output connection can reprogram the dwell time value and the second value stored in the memory, and wherein data and alarms generated by the controller can be output over the input/output connection.

21. The system of claim 20, wherein the input/output connection is a serial data connection.

22. The system of claim 20, wherein the input/output connection is connected to a modem.

23. The system of claim 20, wherein the input/output connection is connected to a touchpad and an associated display.

24. The system of claim 20, wherein the data generated by the controller includes operating reports and alarm logs.

25. The system of claim 20, wherein the data generated by the controller includes diagnostic information.

26. A method for odorizing natural gas in a pipeline, comprising the steps of:
providing liquid odorant in a tank;
measuring gas flow through the pipeline; and
for each preselected quantity of gas flowing through the pipeline, opening a valve in a bypass gas line to allow a known volume of gas, saturated with odorant, to flow from the odorant tank into the pipeline, wherein the valve is opened for a dwell time proportional to the known volume of saturated gas.

27. The method of claim 26, further comprising the steps of:
sensing the temperature of the liquid odorant in the tank; and
in response to changes in the liquid odorant temperature, modifying operation of the valve in the bypass line to compensate for such changes.

28. The method of claim 27, wherein the volume of the liquid odorant in the odorant tank increases when its temperature increases, and decreases when its temperature decreases, and further comprising the steps of:
adding extra openings of the valve in the bypass line to compensate for decreased liquid odorant temperature; and skipping openings of the valve in the bypass line to compensate for increased odorant temperature.

29. The method of claim 26, further comprising the steps of:

sensing whether gas flows through the bypass line when the valve is opened; and closing a shutdown valve to block the bypass line if no gas flow is sensed through the bypass line when the valve is opened.

30. The method of claim 26, further comprising the steps of:

sensing whether gas flows through the bypass line when the valve is opened; and closing a shutdown valve to block the bypass line if gas flow is sensed through the bypass line when the valve is closed.

31. The method of claim 26, wherein gas flowing through the pipeline is measured with a flowmeter, and further comprising the steps of:

monitoring operation of the flowmeter;

if the flowmeter ceases operating to accurately measure the flow of gas through the pipeline, opening the valve at regular intervals regardless of the measured gas flow through the pipeline.

32. The method of claim 31, wherein the regular intervals are prestored time intervals.

33. The method of claim 31, wherein the regular intervals are selected to be approximately equal to time intervals in which the valve was opened while the flowmeter was working.

34. The method of claim 26, further comprising the step of:

communicating with a remote computer over a data link, wherein the remote computer is provided with data indicative of operation of the valve.

35. The method of claim 34, further comprising the step of:

accepting data from the remote computer to change the known volume of gas and the preselected quantity of gas.

36. The method of claim 34, further comprising the step of:

exchanging diagnostic information with the remote computer over the data link.

37. A method for operating a programmable controller, comprising the steps of:

storing data representing a dwell time and a preselected quantity of gas, the dwell time representing a time in which the preselected quantity of gas will flow through a valve;

accepting an input signal representing gas flow through a pipeline;

when the input signal indicates that the preselected quantity of gas has flowed through the pipeline, driving an output signal for a time period equal to the dwell time.

38. The method of claim 37, further comprising the steps of:

accepting a second input signal representing temperature of a liquid odorant; and modifying the driving of the output signal in response to changes in the second input signal.

39. The method of claim 38, further comprising the steps of:

when the second input signal indicates that the liquid odorant has expanded, suppressing driving the output signal; and when the second input signal indicates that the liquid odorant has contracted, driving an extra output signal.

40. A method of operating a programmable controller to odorize natural gas flowing in a pipeline, comprising the steps of:

entering into a computer a desired odorant use rate, data representing operating characteristics of a control valve, data indicating solubility of the odorant in natural gas at operating pressure and correction factors for gas and atmospheric pressures, and a desired volume of gas per pulse of odorized bypass gas;

calculating a gas flow rate through the control valve;

calculating a dwell time for the control valve from the desired odorant use rate, the gas flow rate through the control valve, the solubility data, the pressure correction data, and the desired volume of gas per pulse;

storing into a programmable controller the calculated dwell time and the desired volume of gas per pulse; and within the controller, using the stored dwell time and desired volume of gas per pulse to operate the control valve.

41. The method of claim 40, wherein the computer is located remotely from the controller, and wherein the storing step comprises storing the calculated dwell time and desired volume of gas per pulse over a communications link between the computer and the controller.

42. The method of claim 40, further comprising the steps of:

maintaining within the computer temperature compensation information defining changes in volume of the liquid odorant with changes in temperature;

in the storing step, storing in the programmable controller data indicative of liquid odorant volume changes as a function of temperature changes; and within the controller, modifying operating of the control valve in response to changes in liquid odorant temperature.

43. The method of claim 42, wherein the volume of the liquid odorant increases when its temperature increases, and decreases when its temperature decreases, and further comprising the steps of, within the programmable controller:

adding extra openings of the valve to compensate for decreased liquid odorant temperature; and skipping openings of the valve to compensate for increased odorant temperature.

* * * * *